3,135,793
HYDROXYALKYLENEDIIMINOTETRA-ACETAMIDES

William F. Bruce, Havertown, and Joseph Tokolics, King of Prussia, Pa., assignors to American Home Products Corporation, New York, N.Y., a corporation of Delaware
No Drawing. Filed Mar. 6, 1962, Ser. No. 177,718
2 Claims. (Cl. 260—559)

The invention relates generally to amides, and more particularly to novel di-bisacetamides and salts thereof.

In U.S. Patent 2,780,646 there are disclosed novel alkanol aminobisacetamides, their salts, and methods for producing them. As noted in the patent, the compounds disclosed and claimed therein show surprisingly good local anesthetic action. However, it is stated in the patent that the replacement in the class of compounds disclosed therein, of the hydroxy group with an amino radical, for example, was found to destroy the local anesthetic action and that other than in the cases of aliphatic, aromatic or heterocyclic or inorganic acid esters of said compounds, no prediction with regard to local anesthetic action is possible when other radicals replace the alkanol residue attached to the amino nitrogen atom.

It has now been discovered that certain other bis-acetamides which are of the nature of di-bisacetamides as defined hereinafter, also show good local anesthetic action and, in addition, also show broad spectrum antibiotic action. The new compounds, in the form of the free bases, may be represented by the formula:

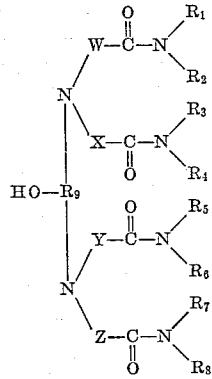

wherein $R_1$ and $R_3$, $R_5$ and $R_7$ represent lower alkyl radicals, $R_2$, $R_4$, $R_6$ and $R_8$ represent aralkyl radicals, W, X, Y and Z represent divalent lower alkylene radicals, and $R_9$ represents a 1, 2, 3-trivalent radical of the group consisting of propylene, lower-alkyl substituted propylenes, and hydroxy-lower-alkyl substituted propylenes. The aralkyl radicals $R_2$, $R_4$, $R_6$ and $R_8$ may represent phenyl- or substituted phenyl lower alkyl radicals wherein such substituents as lower alkyl- lower alkoxy-, hydroxy-, halogen-, nitro-, amino-, mono- or di- lower alkyl-amino radicals may be on the ring. In the case of aralkyls of the beta-phenylethyl type, hydroxy substituents on the beta-carbon of the alkyl are also contemplated. The 1, 2, 3-trivalent lower-alkyl substituted propylenes contemplated by the invention include, for example, the groups

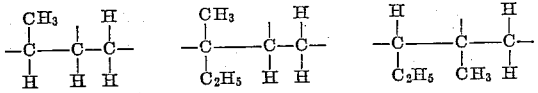

and the obvious variants thereof that will supply the required three carbon chain between the nitrogen atoms of the alkanol-diamino residue in the molecule of the final di-bisacetamides of the invention. The hydroxy-lower-alkyl substituted propylenes referred to are intended to include similar groups wherein the lower-alkyl substituent or substituents may be replaced by hydroxy-lower-alkyl radicals such as in

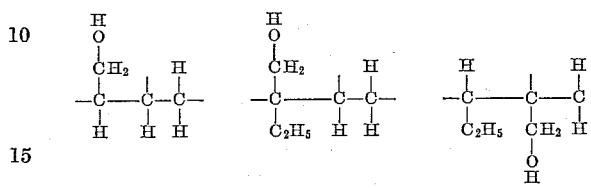

and the like in which any hydroxy group on the alkylene chain is separated from the closest nitrogen atom by at least 2 carbon atoms. A shorter carbon chain between the nitrogen atoms of the diamine residue is not possible in the compounds embraced by the invention, while longer chains adversely affect the desired activity of the resulting compounds. However, increase of the total number of carbon atoms of the alkylene chain by the presence of branch chains as exemplified above, does not have such effect, nor when hydroxy-alkyl groups supply the additional carbon atoms.

The combined local anesthetic action and antibiotic action of these new compounds falling within the definition above were totally unpredictable characteristics. Similarly, no prediction with regard to combined anesthetic and antibiotic action is possible where the radical to which the acetamide groups are attached is other than of the class specified above. For example, the compounds (I) $NH_2.CH_2CH_2N.[CH_2CON(CH_3)C(CH_3)_2.CH_2.C_6H_5]_2$ and (II) $HO.(CH_2)_6.N.[CH_2CON(CH_3)C(CH_3)_2.CH_2.C_6H_5]_2$ were found to have neither anesthetic nor substantial antibiotic action.

Compounds falling within the scope of the formula as given above may be used in the form of acid-addition salts while still retaining their effectiveness for local anesthetic use or antibiotic action as the case may be. The salts provide great flexibility in therapeutic use since they may impart various degrees of water-solubility to an otherwise substantially insoluble base. With reference to the acid-addition salts, either organic or inorganic acids may be used as long as they do not substantially increase toxicity of the compound, particularly when the compound is to be used for its local anesthetic or in vivo antibiotic function. Thus, the hydrochloride, sulfate, phosphate, hydrobromide, acetate, tartrate, propionate or succinate are among the salts considered useful for the purposes indicated.

In preparing the novel bisacetamides of the invention, the free bases are prepared by reacting an appropriate amine which will furnish the desired hydroxy-propyl diamino- residue (as defined above) in the final compound, with an alpha-halo-fatty acid amide containing the required lower alkyl and aralkyl substituents on the nitrogen atom as specified hereinbefore, in a molar ratio of 1:4. Preferably, the amide is present in slight excess of the ratio stated.

On the other hand, where the fatty acid amide residues in the final compounds are desired to be dissimilar, as, for example, where X and Y are to be different alkylene radicals or where $R_1$ is to differ from $R_3$, the bases may be prepared by initially reacting in a molar ratio of say about 1:1, the chosen amine that will supply the hydroxypropyl-amino radical as defined herein, with a halo-fatty acid amide that will supply the X and $R_1$ radicals desired. The resulting amino-fatty acid amide may then be reacted with another halo-fatty acid amide in say about 1:1 molar ratio, the latter amide being chosen so that it will supply the differing Y and $R_3$ radicals desired in the final bisacetamide. As will readily appear to those skilled in the art, the halo-fatty acid amide to amine ratio may be varied (up to 1:3) and the number of step-wise reactions varied depending upon the degree of variation desired in substituents W–Z and $R_1$–$R_8$. Alternately, appropriate mixtures of differing halo-fatty acid amides may be reacted simultaneously with the amine compound in the total molar ratio of 4:1. The halogen atom in the halo-fatty acid amides used may be either chlorine or bromine. Generally, the di-bisacetamides of the invention are prepared as taught by the general procedure outlined in the patents to Bruce et al., 2,568,142, dated September 18, 1951, or 2,654,754, dated October 6, 1953, suitably modified, of course, to provide the proper amine and halogenated reactants.

The reaction of the amide and amine is carried out substantially under conditions as described in the above-mentioned U.S. Patent No. 2,780,646. Thus, the reaction temperature is in the range of about 80° to about 200° C. but is preferably in the narrower range of about 100° to about 180° C. Alcohols of 3 to 7 carbon atoms, anisole, dioxane, hydrocarbon solvent, such as xylene, or in fact, any inert solvent boiling within the ranges indicated are suitable, reaction taking place at the refluxing temperature of the solvent. Acid acceptors or mildly basic material are also provided for the reaction. These acceptors may be an alkali or alkaline earth metal oxide, carbonate or bicarbonate, pyridine, or like substances.

To prepare the acid-addition salts of the compounds discussed herein, the free base is generally dissolved in a suitable solvent and the selected acid is added thereto. Such preparation of acid-addition salts is well known and hence need not be described herein.

The following example illustrates the preparation of a typical compound falling within the scope of the invention.

EXAMPLE 1

*Preparation of 2,2',2'',2'''-(-2-Hydroxytrimethylenediimino)-Tetrakis[N-(a,a-Dimethylphenethyl)-N-Methylacetamide].Di-Hydrochloride*

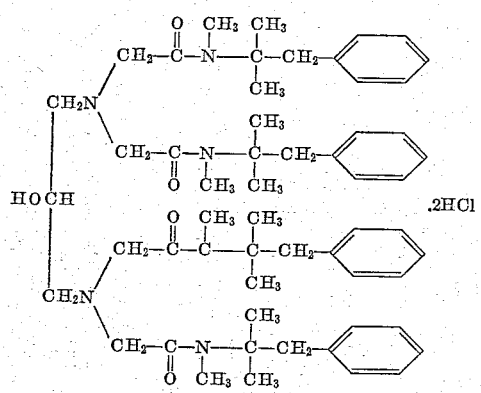

A mixture of 96 g. of 2-chloro-N-(a,a-dimethylphenethyl)-N-methylacetamide, 9.02 g. of 1,3-diamino-2-propanol, 50 g. of powdered potassium carbonate and 250 ml. of n-butanol was refluxed for 24 hours. The reaction mixture was then cooled and filtered. The filtrate was washed with aqueous 5% sodium carbonate, then with water and dried over anhydrous magnesium sulfate. The solvent was completely removed under reduced pressure.

The free base was converted to the hydrochloride by dissolving the residue in ether and adding dry hydrogen chloride. Recrystallized from acetone-chloroform, it melted at 170–172° C.

Analysis: Calcd. for $C_{55}H_{80}Cl_2N_6O_5$: Cl, 7.26; N, 8.61. Found: Cl, 7.00; N, 8.54.

The products of the example in the form of the designated acid-addition salt and several other compounds included for purposes of comparison were tested to determine their respective local anesthetic and bacteriostatic action. The method of testing for local anesthetic action comprised the simple procedure of placing .1 mg. of the compound on the tongue of a human and then noting subjectively the time it took for numbness to subside. To designate the degree of local anesthetic action of the compounds tested, an arbitrary scale was employed wherein + was used to designate anesthetizing characteristics which persist for from 2–5 minutes. On this same scale ++ would indicate anesthetic action for from 15–20 minutes, and +++ for such action enduring from 1–2 hours. The ++++ designation was used to indicate anesthetic action wherein numbness persisted for 3–4 hours; the +++++ rating would be applied to compounds causing numbness for from 8–10 hours; and the ++++++ rating would designate local anesthetic action persisting from 15–20 hours. This scale is employed in the Table below.

In testing for bacteriostatic action, the method generally comprised preparation of a plurality of Petri dishes each containing a predetermined amount of agar media into which solutions of decreasingly varying concentrations of each of the compounds under consideration were incorporated starting with a maximum concentration thereof per volume of solution, to which a standard volume of a given bacterial strain was later introduced. If bacterial growth was observed to be halted, the same standard volumes of the given bacterial strain were separately added to each of other agar specimens containing lesser amounts of the compound being tested. In said agar specimens, decreasing concentrations of a specified compound of 1000, 500, 250, 100, 25, 10 and 1 μg. were utilized.

In the specific application utilized, a series of stock solutions were prepared, each at a level of 10,000 μg./ml., by dissolving the compound being tested in water. As known in the art, other suitable solvents such as ethanol, methylcellosolve, propylene glycol, etc. may be employed. Thereafter, working dilutions of the decreasing concentrations referred to above were made from each stock solution with inclusion of phosphate buffer to achieve pH 6–7. One ml. volumes of the varying working dilutions were then transferred to sterile Petri dishes. To each dish containing the one ml. volume of a specific working dilution of a given compound were then added 9 ml. of sterile penicillin seed agar and the test compound was thoroughly mixed into the agar. Solvent and buffer controls were included. The test organisms were grown in brain heart infusion broth for 18 hours at 35° C. and diluted to 1/10 concentration prior to use. The test organisms, in volumes of approximately 0.8 μl. were then mechanically deposited on the cooled and hardened surface of the agar of each dish by means of an inocula replicator device. The dishes were then incubated for 18 hours at 35° C. before being read. The minimal inhibitory concentration (MIC) value recorded for comparison was the least amount of the compound under test that completely inhibited the specific test organism employed.

The results of the foregoing tests on the compound of

Example 1 and on the several other compounds included for comparison are given in the table below:

TABLE

| Acid-Addition Salt | Anesthetic Action | Bacteriostatic Action | | | | |
|---|---|---|---|---|---|---|
| | | B. subtilis | S. aureus | Mycobact. spp. | Pseudomonas aeruginosa | E. coli |
| 1. Compound of Example 1 | ++++ | 10 | 10 | 250 | >1,000 | >1,000 |
| 2. Cocaine Hydrochloride | + | | | | | |
| 3. 2,2'-(2-hydroxypropylimino)bis[N-(2,6-dimethylphenyl)-N-methyl-acetamide].hydrochloride | Negative | | | | | |

It will be observed that Compound 1 coming within the scope of the invention showed local anesthetic action of a marked degree. The importance of such characteristics will be more readily recognized when it is noted that said Compound 1 was found to be about $4 \times 10^3$ times as effective as novocaine or cocaine. In addition, said Compound 1 showed significant bacteriostatic action. On the other hand, the results with respect to Compound 2 clearly demonstrated the unpredictability of local anesthetic and bacteriostatic action upon variation of the diamine residue from the definition thereof in accordance with the present invention. It is of further significance in connection with the unpredictability of finding combined anesthetic and bacteriostatic action in a given compound that, with respect to the local anesthetic novocaine, Moeller and Schwarz, Ber. 74B 1612 (1941) state that contrariwise the compound is a weak growth promoter for bacteria.

EXAMPLE 2

*Preparation of 2,2',2'',2'''-(2-Hydroxy-2-Methyltrimethylenediimino) - Tetrakis[N-a,a-Dimethylphenethyl) - N-Methylacetamide]Hydrochloride*

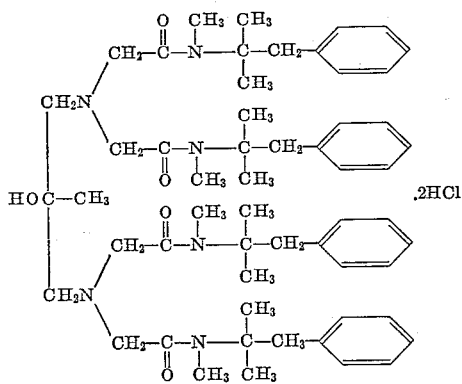

By the procedure in Example 1, a mixture of 96 g. of 2 - chloro - N - (a,a-dimethylphenethyl)-N-methylacetamide, 10.4 g. of 1,3-diamino-2-methyl-2-propanol, 50 g. of powdered potassium carbonate and 250 ml. of n-butanol is refluxed 24 hours to give the product of the title, which is converted to its dihydrochloride in ether by dry hydrogen chloride.

EXAMPLE 3

*Preparation of 2,2',2'',2'''-(2-Hydroxy-1,3-Dimethyltrimethylenediimino)Tetrakis[N - (a,a - Dimethylphenethyl)-N-Methylacetamide]Dihydrochloride*

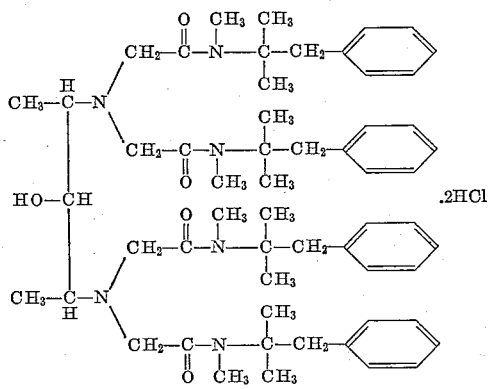

By the procedure in Example 1, a mixture of 96 g. of 2 - chloro - N - (a,a-dimethylphenethyl)-N-methylacetamide, 11.6 g. of 2,4-diamino-3-pentanol, and 250 ml. of n-butanol is refluxed 24 hours to give the title compound, from which the dihydrochloride is obtained by adding dry hydrogen chloride to its ethereal solution.

2,4-diamino-3-pentanol is made by adding freshly distilled butyl nitrite 24 g. in portions to 8.6 g. of diethyl ketone in 100 ml. of dry ether into which dry hydrogen chloride is bubbled. After several hours, the solution is concentrated and the intermediate mixture of stereoisomeric forms of di-oximinoethyl ketone crystallizes and is filtered off. This product is then dissolved in dry ether and lithium aluminum hydride 10 g. is added in small portions. After the reaction mixture has stood overnight, 25 cc. of water is added dropwise and the product 2,4-diamino-3-pentanol is obtained by filtering the mixture and concentrating the ethereal solution.

EXAMPLE 4

*Preparation of 2,2',2'',2'''-(2-Hydroxy-Trimethylenediimino)-Tetrakis-[N-a,a-Dimethylphenethyl-N - Methylpropionamide] Dihydrochloride*

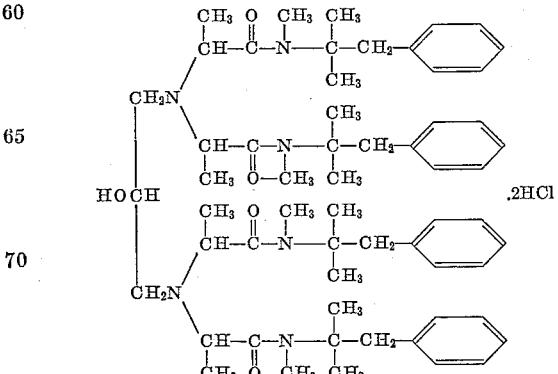

By a procedure similar to that in Example 1, a mixture of 102 g. of 2-chloro-N-(a,a-dimethylphenethyl)-N-methylpropionamide, 9.0 g. of 1,3-diamino-2-propanol, 50 g. of powdered potassium carbonate and 250 ml. of n-butanol is refluxed for 24 hours. The product of the title was secured as in Example 1.

The preparation of 2-chloro-N-(a,a-dimethylphenethyl)-N-methylpropionamide is accomplished by adding 2-chloropropionyl chloride 12.7 g. to N-methyl-omega-phenyl-t-butylamine 33 g. in ether. The hydrochloride which forms is filtered off, and concentration of the ethereal filtrate gives the product above named.

EXAMPLE 5

*Preparation of 2,2',2'',2'''-(2-Hydroxy-2-Methyl-Trimethylenediimino)-Tetrakis-[N,a,a - Dimethylphenethyl - N-Methylpropionamide] Dihydrochloride*

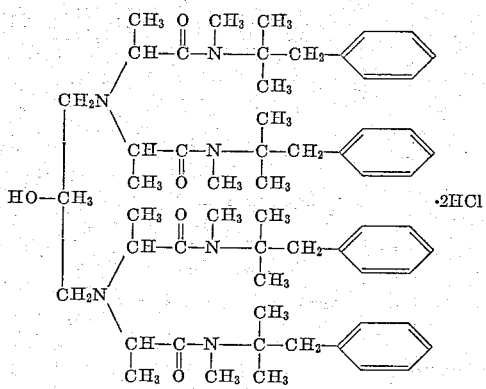

By a procedure like that in Example 1, a mixture of 102 g. of 2-chloro-N-(a,a-dimethylphenethyl)-N-methylpropionamide, 10.4 g. of 1,3-diamino-2-methyl-2-propanol, 50 g. of powdered potassium carbonate and 250 ml. of n-butanol is refluxed for 24 hours. The product of the title is then secured as in Example 1.

We claim:

1. A compound of the group consisting of aralkyl amides and the non-toxic acid-addition salts thereof, said amides being of the formula

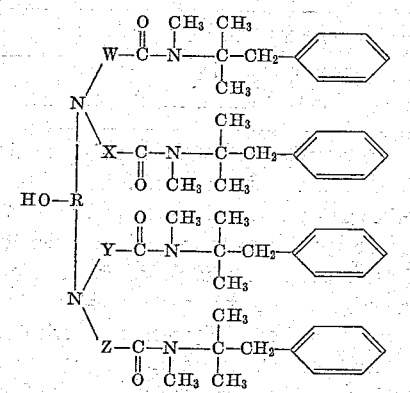

wherein R is a 1,2,3-trivalent radical of the group consisting of propylene, lower-alkyl propylene, and hydroxy-lower-alkyl propylene, and W. X. Y and Z are divalent lower alkylene.

2. The compound, 2,2',2'',2'''-(2-hydroxytrimethylenediimino)-tetrakis-[N-(a,a-dimethylphenethyl) - N - methylacetamide].

No references cited.

UNITED STATES PATENT OFFICE
CERTIFICATE OF CORRECTION

Patent No. 3,135,793                        June 2, 1964

William F. Bruce et al.

It is hereby certified that error appears in the above numbered patent requiring correction and that the said Letters Patent should read as corrected below.

Column 1, line 55, for "phenyl" read -- phenyl- --; column 3, lines 58 to 73, for that portion of the formula reading:

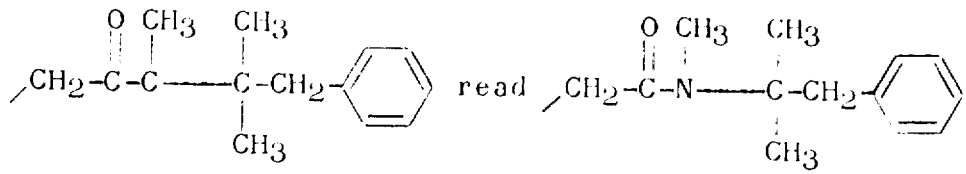

column 5, lines 50 to 65, for that portion of the formula reading:

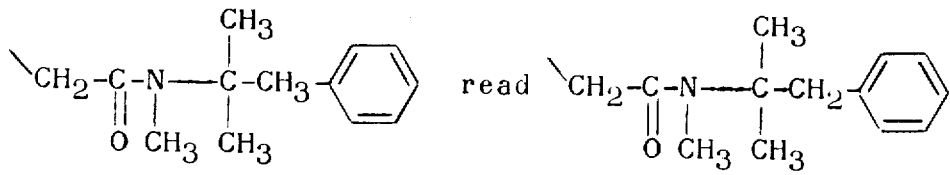

column 7, lines 18 to 33, for that portion of the formula reading:

Signed and sealed this 5th day of January 1965.

(SEAL)
Attest:

ERNEST W. SWIDER                        EDWARD J. BRENNER
Attesting Officer                      Commissioner of Patents